United States Patent [19]

Rohrbach et al.

[11] Patent Number: 4,782,760
[45] Date of Patent: Nov. 8, 1988

[54] VEHICLE PRECISION LOCATION ASSEMBLY

[75] Inventors: Peter Rohrbach, Bath; Per E. Lindquist, Easton, both of Pa.

[73] Assignee: S I Handling Systems, Inc., Easton, Pa.

[21] Appl. No.: 896,908

[22] Filed: Aug. 14, 1986

[51] Int. Cl.⁴ ................................................. B61K 7/00
[52] U.S. Cl. ...................... 104/166; 104/249; 104/307; 198/345; 414/750
[58] Field of Search ............... 104/166, 165, 167, 168, 104/249, 252, 135, 307, 1 R; 198/345; 414/749, 750

[56] References Cited

U.S. PATENT DOCUMENTS

| | | | |
|---|---|---|---|
| 2,624,440 | 1/1953 | Hornberger | 798/345 |
| 3,213,996 | 10/1965 | Tech | 198/345 |
| 3,776,348 | 12/1973 | Yakubek | 198/345 |
| 3,858,626 | 1/1975 | Ribordy | 104/166 |
| 4,239,445 | 12/1980 | Ozawa | 198/345 |
| 4,428,300 | 1/1984 | Ziegenfus et al. | 104/166 |
| 4,646,649 | 3/1987 | Thatcher et al. | 104/166 |

OTHER PUBLICATIONS

Brochure title "Industrial V-Guide Wheels and Track", (Dual Vee), 1981.

Primary Examiner—Robert B. Reeves
Assistant Examiner—Donald T. Hajec
Attorney, Agent, or Firm—Seidel, Gonda, Lavorgna & Monaco

[57] ABSTRACT

A vehicle precision location assembly including a precision shoe mounted on the vehicle and having planar surfaces which converge towards an end of the shoe and intersect along an edge inclined with respect to the horizontal and a pair of rollers mounted alongside a track and having their axes of rotation canted with respect to each other such that each roller contacts the shoe surfaces along a line substantially parallel to the axis of the roller whereby the vehicle will be centered in a direction transverse to the direction of travel of the vehicle and without any play in the transverse direction regardless of wear.

11 Claims, 8 Drawing Sheets

FIG. 13

VEHICLE PRECISION LOCATION ASSEMBLY

BACKGROUND OF THE INVENTION

The standard method for locating a driverless vehicle at a predetermined location is by means of a locating pin such as that illustrated in FIG. 15 of U.S. Pat. No. 3,858,626. A locating pin of that type has an accuracy of about 0.015 inches. In an automated assembly line system, there is a need for substantially greater accuracy. A more accurate system for locating a driverless vehicle at a predetermined location, with an accuracy of ±0.005 inches in three planes, is described in U.S. Pat. No. 4,428,300. In that system, a shoe or pad having a tapered nose is mounted on the underside of the vehicle and cooperates with a cluster of at least three rollers so as to elevate the vehicle so that support wheels thereon are spaced from the tracks while centering the vehicle in a direction transverse to the direction of travel of the vehicle. One of the rollers is employed to elevate the vehicle. The remaining two rollers are centering rollers which center the vehicle as it is being elevated. Only one of the centering rollers may contact a tapered surface of the shoe as the vehicle is being centered resulting in non-uniform roller wear and possible loss of centering accuracy. The rollers must be precisely spaced so as to contact opposite non-tapered sides of the shoe once the vehicle has been centered in order to retain the vehicle in the centered position as shown in FIG. 3 of the patent. The width of the shoe must therefore be maintained in strict tolerance. If the width of the shoe is out of tolerance and too narrow, there will be excessive clearance between the shoe and the centering rollers thereby preventing the vehicle from being precisely centered. If the width of the shoe is too great, the shoe will be jammed between the rollers such that the vehicle cannot be moved to or from the centered position.

The problem solved by the present invention is that of precisely locating a vehicle which may have a length of 10-15 feet with an accuracy of ±0.005 inches or better in three planes with a minimum number of rollers without scrubbing or scuffing of the centering rollers and while insuring that the centering rollers experience the same, uniform wear so that there is no play during centering regardless of wear.

BRIEF SUMMARY OF THE INVENTION

The present invention is directed to a precision location assembly adapted to form part of a conveyor system for driverless vehicles. The assembly includes a frame supporting a drive tube between first and second tracks. A motor means is coupled to the drive tube for rotating the drive tube about its longitudinal axis. A means is provided for causing a driverless vehicle to stop at a predetermined location. At said location, there is provided a means located only alongside one track for elevating the vehicle so that support wheels thereon are spaced from the tracks and a means located only alongside the opposite track for centering the vehicle in a direction transverse to the direction of travel of the vehicle as the vehicle is being elevated. The means for centering the vehicle includes a shoe and a pair of canted, spaced centering rollers. The shoe is mounted on the vehicle and has inclined planar surfaces which converge towards an end of the shoe and intersect along an edge inclined with respect to the horizontal and staggered, inclined, planar surfaces which do not converge towards an end of the shoe. The centering rollers have their axes of rotation canted with respect to each other and are spaced from each other along the direction of travel of the vehicle such that each roller contacts the surfaces of the shoe along a line substantially parallel to the axis of rotation of the roller.

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
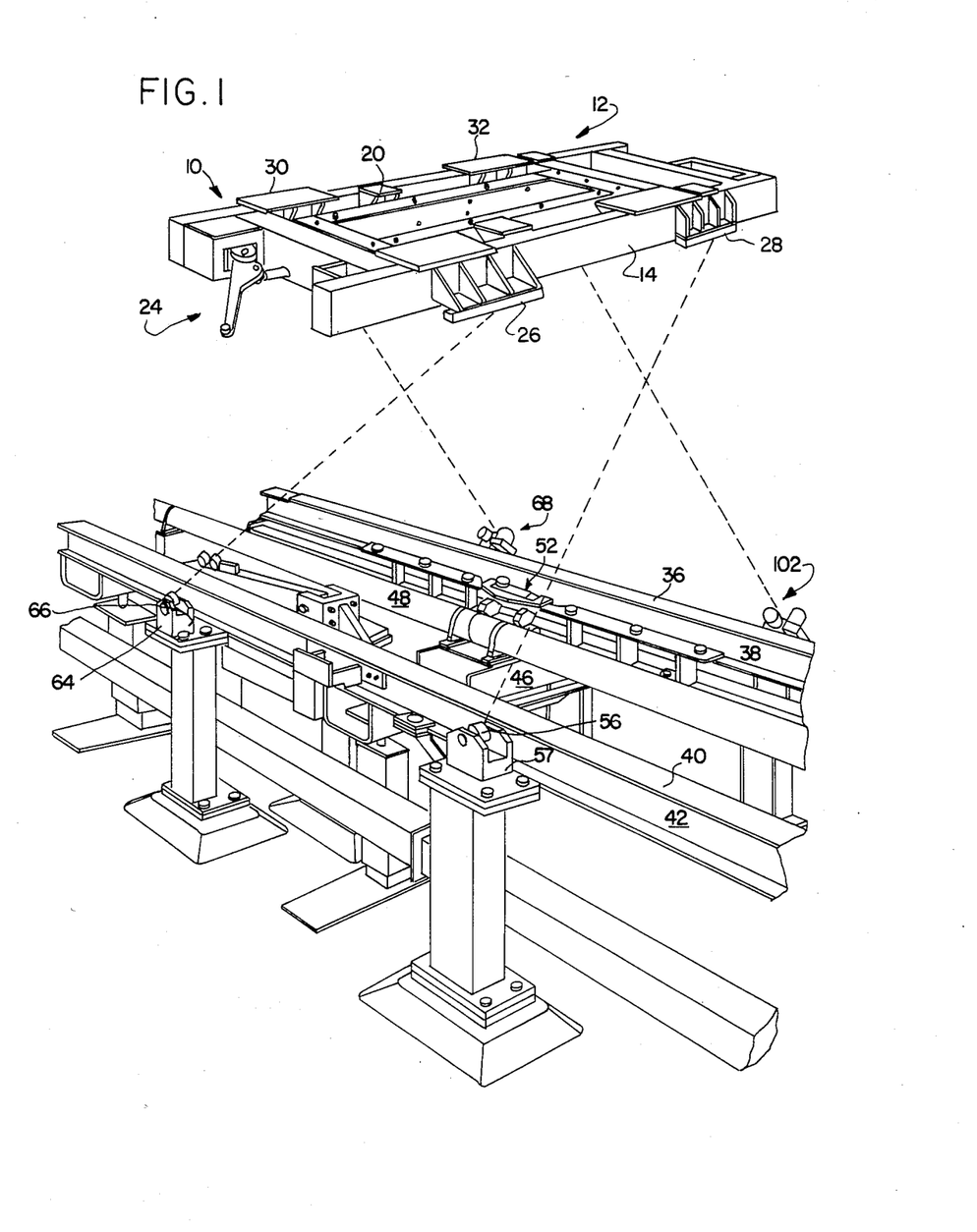
FIG. 1 is an isometric showing a driverless vehicle and a precision location assembly in accordance with the present invention.

Referring to the drawings in detail, wherein like numerals indicate like elements, there is shown in FIG. 1 a precision location assembly in accordance with the present invention designated generally as 10, including a driverless vehicle designated as 12.

Figure 3:
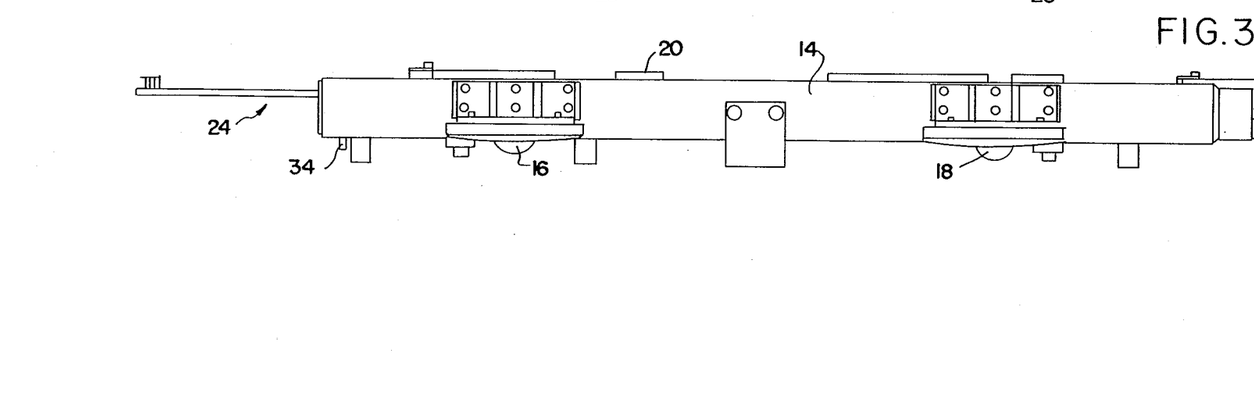
FIG. 3 is a side elevation of the driverless vehicle.

The vehicle 12 includes a rectangular frame 14 having front support wheels 16 and rear support wheels 18. See FIG. 3. The top surface of frame 14 is provided with tooling subplates 20. The subplates 20 facilitate precision location of work to be acted on by automatic equipment at work stations along an endless conveyor along which the vehicle 12 moves. The vehicle 12 includes a drive wheel assembly 22 as well as means 24 coupled to the drive wheel assembly so as to cause the vehicle to accumulate when it contacts another vehicle in front of it while moving along the conveyor. Such means for causing accumulation as well as the drive wheel assembly may be of the type disclosed in U.S. Pat. No. 3,818,837.

The vehicle 12 is provided on one side with precision shoes 26 and 28 adjacent the front end and rear end of the vehicle, respectively, and on the outside of one side of frame 14. Precision shoes 26 and 28 are of the type disclosed in U.S. Pat. No. 4,428,300. The vehicle 12 is also provided with precision shoes 30 and 32 adjacent the front end and rear end of the vehicle, respectively, and on the outside of the other side of frame 14. Preferably, the shoes on one side of the frame, such as shoes 26 and 28, are not aligned with one another. At any desirable location, but preferrably adjacent the front end, the vehicle 12 is provided with a fore-aft locator tongue member 34.

The assembly 10 includes a track 36 on a rail 38 along one side thereof and a track 40 on a rail 42 on the other side thereof. The rails 38, 42 are supported by a frame designated generally as 44. The frame includes a drive pan 46 supported by upright legs. The number of drive pans and legs varies with the length of the assembly 10. A drive tube 48 is disposed between the tracks 36, 40 and is supported by the drive pan 46. Drive tube 48 is rotated about its longitudinal axis by a motor 50 having its output pulley coupled to the drive tube 48 by an endless belt.

A means is provided for causing a vehicle to stop at a predetermined location along the length of the assembly 10. Such means includes a station 52 such as described in U.S. Pat. No. 4,428,300. The station includes a cam which operates a cam follower 54 in drive wheel assembly 22 so as to change the orientation of the vehicle drive wheels in assembly 22 with respect to the longitudinal axis of drive tube 48 thereby slowing the vehicle.

Figure 12:
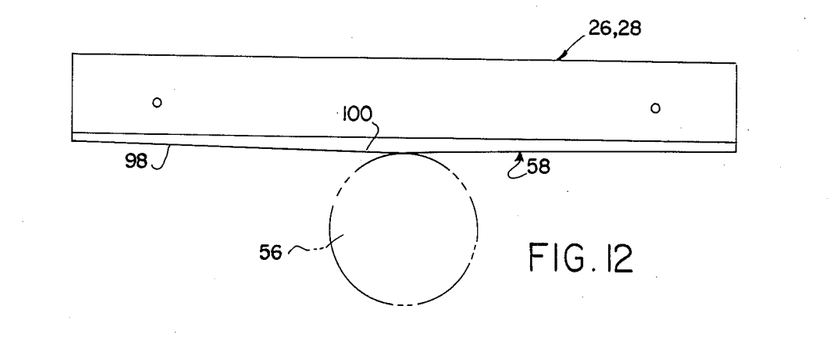
FIG. 12 is a side elevation of the shoe used to elevate the vehicle.

An elevating means is provided on the assembly 10 for elevating the rear end of the vehicle 12 at a predetermined location. Such means includes a roller 56 mounted for rotation about a horizontal axis on a support 57 alongside rail 42. Roller 56 is adapted to cooperate with precision shoe 28. See FIG. 12 wherein the bottom surface 58 of shoe 28 is in rolling contact with roller 56. Bottom surface 58 is preferrably inclined at the front and rear with a flat or planar horizontal surface therebetween as shown in FIG. 12. Note that the side faces 60 and 62 of pad 28 are not tapered as the shoe 28 does not pass between any guide rollers or the like for centering the vehicle.

A similar means is provided for simultaneously elevating the front end of the vehicle 12. Thus, a roller 64 is rotated about a horizontal axis on a support 66. Support 66 is on the same side of rail 42 as is support 57. Compare FIGS. 4 and 5. Roller 64 is adapted to cooperate with the bottom surface on precision shoe 26. The spacing between rollers 56, 64 in the direction of travel of the vehicle is the same as the center spacing between precision shoes 28, 26 in the same direction.

Figure 4:
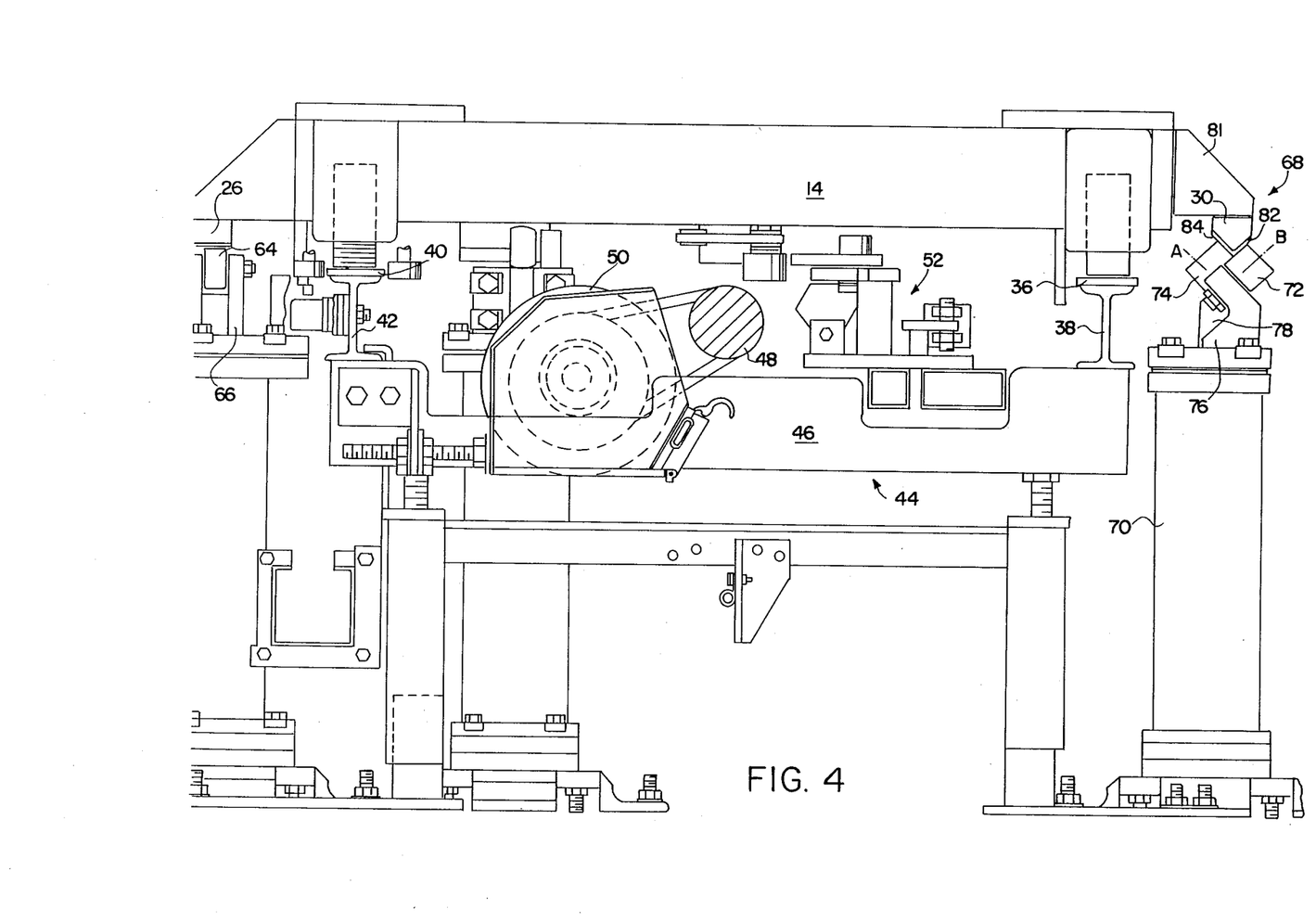
FIG. 4 is a cross-section of the precision location assembly taken along the front end of the driverless vehicle.
Figure 5:
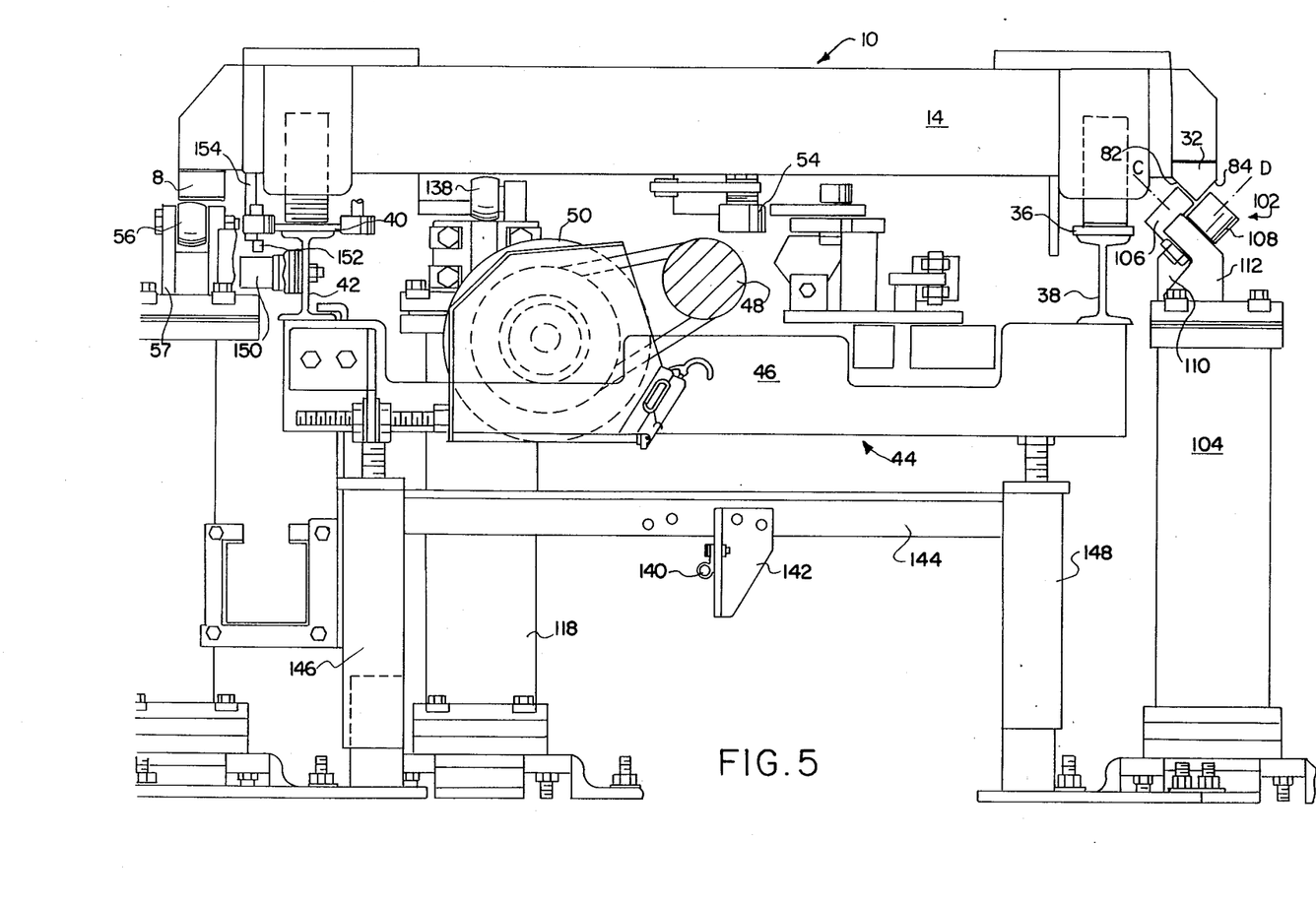
FIG. 5 is a cross-section of the precision location assembly taken along the rear end of the driverless vehicle.
Figure 6:
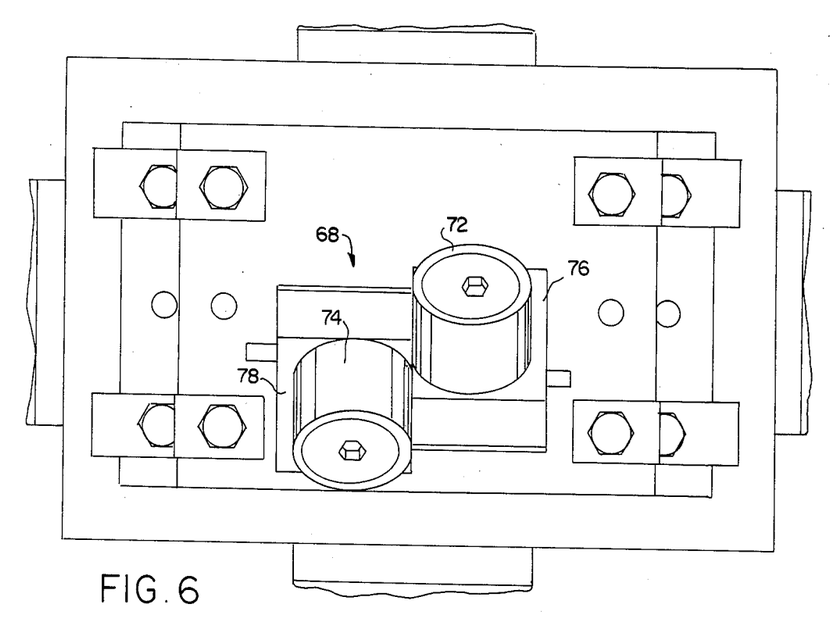
FIG. 6 is a top plan view of the canted, spaced centering rollers.
Figure 7:
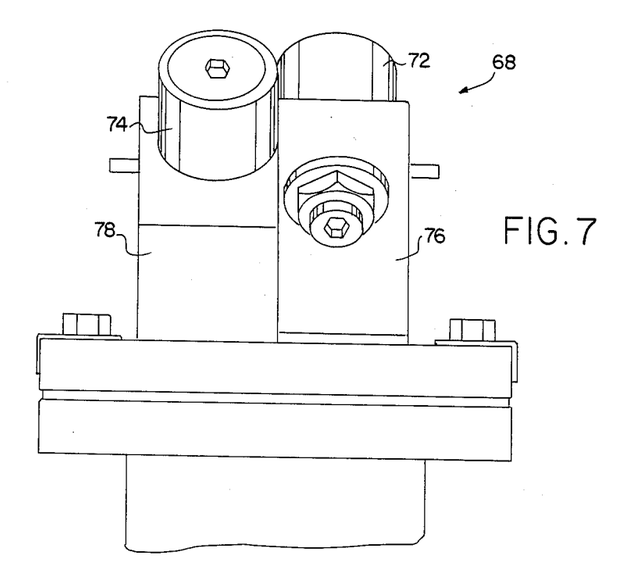
FIG. 7 is an elevation of the centering rollers.
Figures 8, 9, 10:
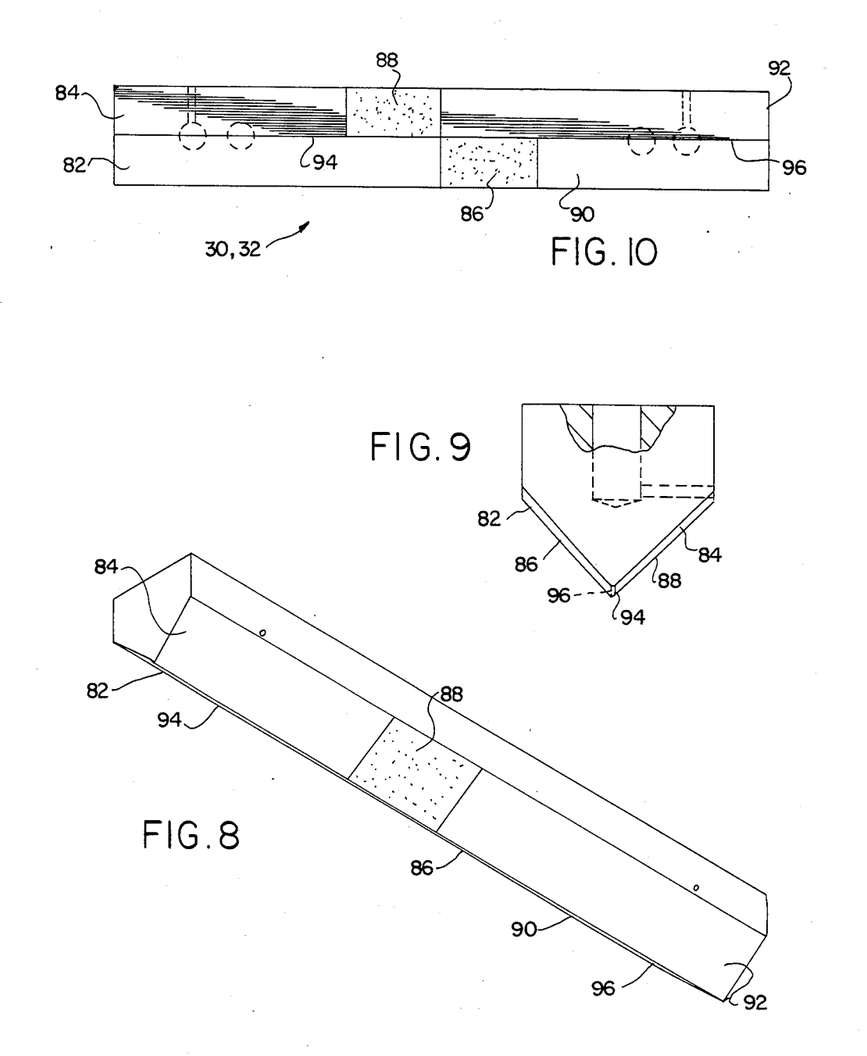
FIG. 8 is an isometric of the shoe which is mounted on the driverless vehicle and used to center the vehicle in cooperation with the centering rollers.
FIG. 9 is an end view of the shoe, the other end view being identical.
FIG. 10 is a top plan view of the shoe.
Figure 11:
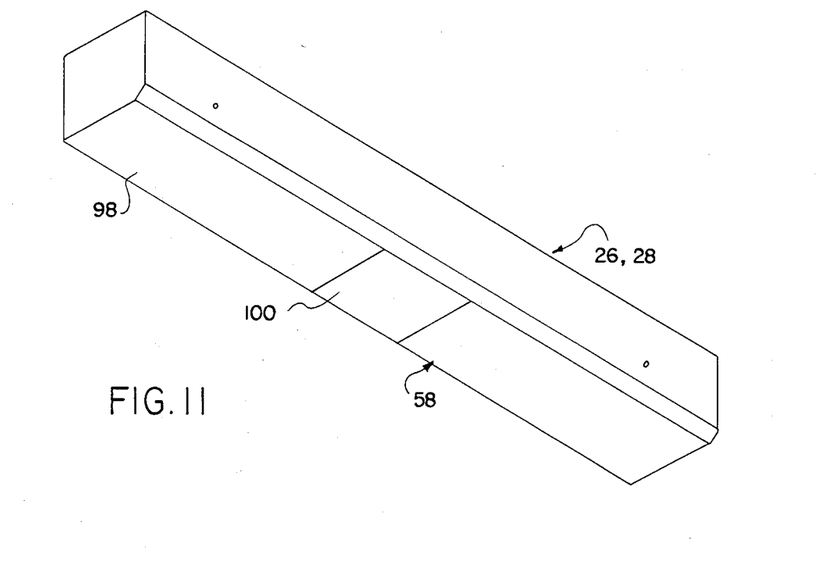
FIG. 11 is an isometric of the shoe which is mounted on the driverless vehicle and used to elevate the vehicle.

Referring to FIG. 4, a means is provided for centering the front end of the vehicle as it is being elevated. Thus, a roller assembly 68 is mounted alongside rail 38 on a floor mounted pylon 70. Roller assembly 68 includes a pair of cylindrical shaped rollers 72, 74 mounted on supports 76, 78 respectively. Each of rollers 72, 74 is eccentrically mounted so as to adjust the roller position. The axes of rotation A, B of the rollers 72, 74 are canted at approximately 90° with respect to each other. Rollers 72 and 74 are adapted to cooperate with the bottom surfaces 80 of precision shoe 30 which is mounted on a bracket 81 secured to the vehicle frame 14. The bottom surfaces 80 of shoe 30 are best shown in FIGS. 8-10 and include inclined, planar surfaces 82, 84 which converge towards an end of the shoe, staggered, inclined, planar surfaces 86, 88 and inclined, planar surfaces 90, 92 which converge towards another end of the shoe. Surfaces 82, 84 intersect along an edge 94 inclined with respect to the horizontal. Surfaces 90, 92 also intersect along an edge 96 inclined with respect to the horizontal. Staggered surfaces 86, 88 are inclined at approximately 90° with respect to each other and do not converge towards either end of the shoe. Each surface 86 and 88 intersects one of the surfaces 82, 92 along an inclined edge which is almost horizontal. The center spacing between the surfaces 86 and 88 in the longitudinal direction is equal to the center spacing between rollers 72, 74 in the direction of travel of the vehicle. Compare FIGS. 6, 7 and 8. Rollers 72 and 74 center the front end of the vehicle as it is being elevated by roller 64. Rollers 72, 74 make rolling contact with shoe surfaces 84, 82 respectively while the front end of the vehicle is elevated due to rolling contact between roller 64 and inclined surface 98 of shoe 26. The contact between the peripheral surfaces of rollers 72, 74 and shoe surfaces 84, 82 is a perfect line contact wherein the line of contact is parallel to the associated roller axis A, B. Consequently, any wear is distributed uniformly across the line of contact. In addition, rollers 72, 74 will contact the shoe surfaces 88, 86 respectively at the same time so that the rollers will wear identically. As a result, any wear experienced by the rollers will not affect centering of the vehicle. Thus, centering rollers 72, 74 contact shoe 30 along surfaces 82, 84 and 86, 88 to center the vehicle without any play and regardless of wear.

Shoes 26 and 30 are dimensioned so that rollers 72, 74 will contact shoe surfaces 88, 86 respectively to thereby center the vehicle when roller 64 contacts flat 100 on shoe 26 to locate the vehicle at a predetermined elevation.

A similar means is provided for centering the rear end of the vehicle 12. See FIG. 5. Thus, a roller assembly 102 is mounted on a floor mounted pylon 104. The roller assembly includes cylindrical shaped centering rollers 106 and 108 having their axes of rotation C, D canted at approximately 90° with respect to each other. The rollers 106, 108 are eccentrically mounted on supports 110, 112 respectively. Rollers 106, 108 are spaced in the direction of travel of the vehicle in the same manner as are rollers 72 and 74. Rollers 106, 108 cooperate with precision shoe 32 in the same manner that rollers 72, 74 cooperate with precision shoe 30, so as to center the rear end of the vehicle as it is being elevated due to rolling contact between roller 56 and precision shoe 28.

Note that in the foregoing description of operation of the precision location assembly 10, roller supports 110, 112 are preferably mounted closer to rail 38 than roller supports 76, 78. Compare FIGS. 4 and 5. Support 57 is preferably mounted closer to rail 42 than roller support 66. Thus, shoe 28 contacts roller 56 but not roller 64 while shoe 32 contacts rollers 106, 108 but not rollers 72, 74. Similarly, shoe 26 contacts roller 64 but not roller 56 while shoe 30 contacts roller 72, 74 but not rollers 106, 108. Preferably, the center spacing between precision shoes 30, 32 in the direction of travel of the vehicle is the same as the center spacing between precision shoes 26, 28 in the same direction. Similarly, the center spacing between rollers 106, 108 and 72, 74 is the same as the center spacing between rollers 56 and 64. As a result, rollers 106, 108 and rollers 72, 74 reach the central regions (surfaces 86, 88) of precision shoes 32, 30 respectively at the same time that rollers 56 and 64 reach the central (horizontal) regions of precision shoes 28, 26, respectively.

Figure 13:
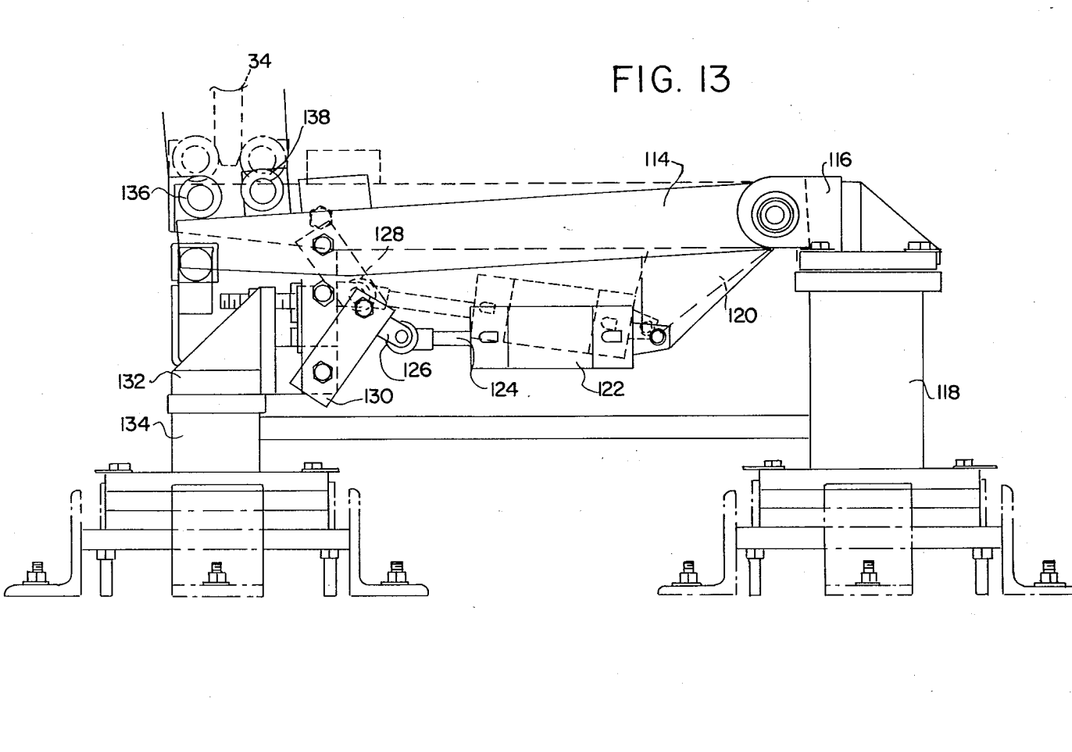
FIG. 13 is an elevation of the portion of the precision location assembly used to locate the driverless vehicle in a predetermined fore-aft position.

A mechanism is provided for adjusting the fore-aft position of the vehicle 12 while elevated and centered as described above. Such mechanism includes an arm 114 pivotably coupled to a clevis 116 mounted on a floor mounted pylon 118. The arm 114 includes a depending bracket 120. A pneumatically operated cylinder 122 is pivotably coupled at one end to the bracket 120. A piston rod 124 is pivotably coupled to a clevis 126 which is pivotably coupled to the overlapping ends of links 128 and 130. The links 128, 130 define a toggle linkage. An identical toggle linkage (not shown) is located on the other side of arm 114. Link 128 is pivotably coupled to arm 114. Link 130 is pivotably coupled to a bracket 132 mounted on a floor mounted pylon 134. The free end of arm 114 is provided with a pair of guide rollers 136, 138 which rotate about horizontal axes. The rollers 136, 138 are adapted to contact the fore-aft locator tongue 34 on the underside of vehicle 12 when arm 114 is in the engaged position shown in phantom lines in FIG. 13. Normally, piston rod 124 is retracted and arm 114 is in the disengaged position shown in solid in FIG. 13 wherein rollers 136, 138 have been swung below the elevation of locator tongue 34. Cylinder 122 is provided with pressurized air via a conduit and solenoid control valve (not shown) coupled to an air distribution manifold 140 (see FIG. 5). Manifold 140 is mounted on a bracket 142 secured to a beam 144 fixed at either end to drive pan support pylons 146 and 148.

Figure 2:
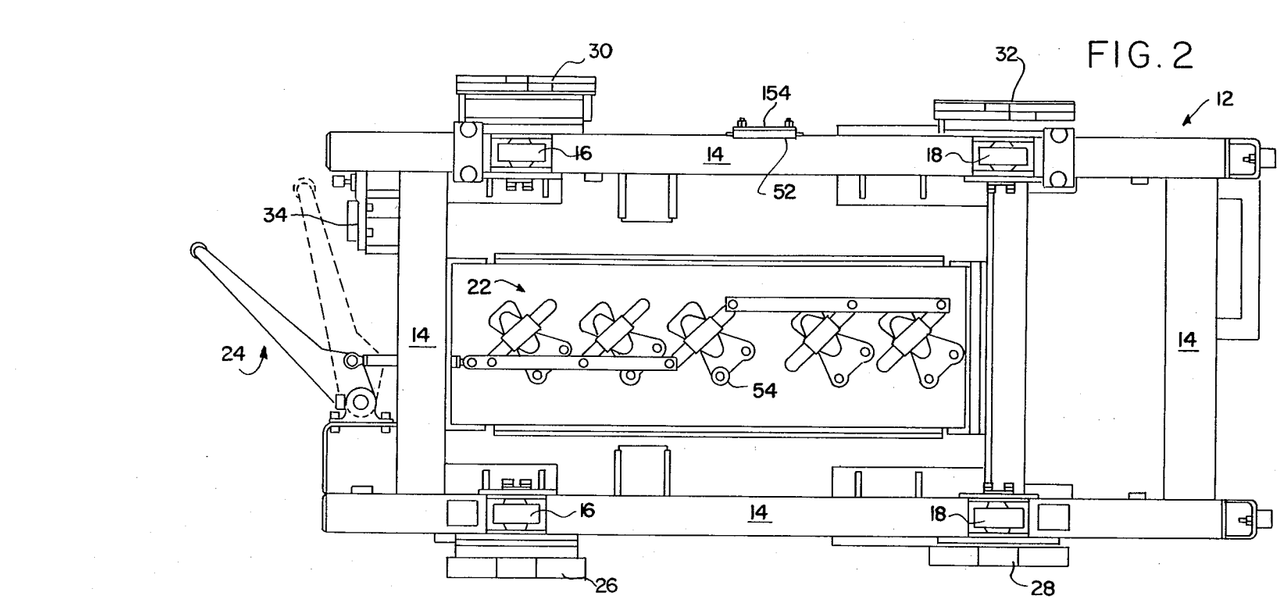
FIG. 2 is a bottom plan view of the driverless vehicle.

The solenoid control valve is operated by a proximity switch 150 which is bolted to rail 42. A switch actuator 152 is mounted on a plate 154 secured to the vehicle frame 14. See FIGS. 2 and 5. Preferrably, proximity switch 150 is in the form of an inductive sensor and the switch actuator 152 is in the form of a steel bar. When the switch and actuator are in juxtaposition, the switch operates the solenoid-controlled valve to supply pressurized air to cylinder 122 thereby pivoting arm 114 upwardly to the engaged position wherein rollers 136, 138 engage tongue 34 so as to latch the vehicle in a predetermined fore-aft position.

Operation of the apparatus of the present invention is as follows. Vehicle 12 is transferred from an upstream portion of the conveyor system onto the track section containing the portions of the precision location assembly 10 already described by frictional contact between the drive wheel assembly 22 and a drive tube corresponding to drive tube 48. The vehicle is then driven by drive tube 48 which is driven by motor 50. The vehicle 12 is slowed down by contact between the cam at station 52 and the cam follower 54 forming part of the drive wheel assembly 22. The station cam causes the drive wheel assembly 22 to pivot about a vertical axis thereby causing the drive wheels to move toward an accumulation position. As the vehicle 12 comes to a stop, the rear end of the vehicle will be elevated by the rollers 56 and 106, 108, the front end of the vehicle will be elevated by rollers 64 and 72, 74, and the vehicle will be centered in a direction transverse to the direction of travel of the vehicle by rollers 72, 74 and 106, 108 as the vehicle is being elevated. When vehicle 12 is elevated and centered, proximity switch 150 is actuated and arm 114 is swung upwardly by cylinder 122 to latch the vehicle in a predetermined fore-aft position.

While the vehicle is stopped and precisely positioned by the location assembly 10, the drive tube 48 continues to rotate about its longitudinal axis. Drive wheel assembly 22 remains in contact with drive tube 48. The vehicle 12 will remain stationary on the elevating rollers 56, 64 and centering rollers 72, 74 and 106, 108 with front wheels 16 and rear wheels 18 spaced by a small distance from the top surface of their respective tracks 36, 40. When the fore-aft locator arm 114 is swung to the up position, a proximity switch (not shown) detects same, and the work supported by subplates 20 on the vehicle 12 will be inspected, machined, welded, etc. Thereafter, cylinder 122 will be operated to swing arm 114 downward to the disengaged position. A proximity switch (not shown) detects arm 114 in the down position thereby operating a cylinder at station 52 whereby the station can release the vehicle cam follower 54. Thereafter, the drive assembly 22 will pivot under spring pressure to a drive position, and due to frictional contact with drive tube 48, will drive the vehicle 12 off the rollers 56, 64, 72, 74 and 106, 108. Thereafter, the front wheels and rear wheels 18 will be in rolling contact with their respective tracks 36, 40.

The vehicle precision location assembly of the present invention elevates the vehicle 12 while centering the vehicle transversely of the tracks and then adjusts the fore-aft position of the vehicle. Each of the rollers 56, 64 and 72, 74 and 106, 108 is preferably crowned along its contact surface and provided with an eccentric mounting facilitating fine adjustment of the rollers for precision positioning whereby accuracy of ±0.005 inches or better may be attained in positioning the vehicle 12. The shoes 26, 28 are identical and each is symmetrical end to end with respect to a vertical plane which bisects the shoe along its width. The shoes 30, 32 are also identical and each is symmetrical end to end with respect to a vertical plane which bisects the shoe along its width. Accordingly, the driverless vehicle 12 may be centered as previously described either when traveling in a forward direction or in a reverse direction along the tracks.

The present invention may be embodied in other specific forms without departing from the spirit or essential attributes thereof and, accordingly, reference should be made to the appended claims, rather than to the foregoing specification, as indicating the scope of the invention.

We claim:

1. A vehicle precision location assembly comprising a frame supporting a drive tube between spaced tracks, motor means coupled to said tube for rotating said tube about its longitudinal axis, means for elevating the vehicle so that support wheels thereon are spaced from the track, and centering means for centering the vehicle in direction transverse to the direction of travel of the vehicle as it is being elevated, said centering means including a first shoe mounted on the vehicle, said first shoe having front and rear ends and inclined planar surfaces which converge toward one of said ends of the shoe and intersect along an edge inclined with respect to the horizontal, and a pair of rollers having their axes of rotation canted with respect to each other such that said rollers contact both said inclined planar surfaces whereby the vehicle is centered without any play in said transverse direction as said rollers wear.

2. The vehicle precision location assembly according to claim 1 wherein said means for elevating the vehicle includes a second shoe mounted on the vehicle, said second shoe having planar surfaces which are inclined with respect to the horizontal and spaced apart by a planar, horizontal surface therebetween, and a roller positioned so as to contact said second shoe surfaces.

3. A vehicle precision location assembly comprising a frame supporting a drive tube between spaced tracks, motor means coupled to said tube for rotating said tube about its longitudinal axis, means at each end of the vehicle for elevating the vehicle so that support wheels thereon are spaced from the tracks while centering the vehicle in a direction transverse to the direction of travel of the vehicle, said means comprising first means for elevating the vehicle and second means for centering the vehicle as it is being elevated, said second means for centering the vehicle including a first shoe mounted on the vehicle, said first shoe having front and rear ends and inclined planar surfaces which converge towards one of said ends of the shoe and intersect along an edge inclined with respect to the horizontal, and a pair of rollers having their axes of rotation canted with respect to each other such that said rollers contact both said inclined planar surfaces whereby the vehicle is centered without any play in said transverse direction as said rollers wear.

4. The vehicle precision location assembly according to claim 3 wherein said first means for elevating the vehicle includes a second shoe mounted on the vehicle, said second shoe having planar surfaces inclined with respect to the horizontal and spaced apart by a planar horizontal surface therebetween, and a roller positioned so as to contact said second shoe surface.

5. A vehicle precision location assembly comprising a frame supporting a drive tube between spaced tracks, motor means coupled to said tube for rotating said tube about a longitudinal axis, first means at the front end of the vehicle and alongside one of the tracks for elevating the vehicle front end so that support wheels thereon are spaced from the tracks, second means at the vehicle front end and alongside the opposite track for centering the vehicle front end in a direction transverse to the direction of travel of the vehicle as the vehicle front end is being elevated, third means at the rear end of the vehicle and alongside said one track for elevating the rear end of the vehicle, fourth means at the rear end of the vehicle and a alongside said opposite track for centering the vehicle rear end in a direction transverse to the direction of travel of the vehicle as the vehicle is being elevated, the distance between said first and second means transverse to the tracks being different from the distance between said third and fourth means transverse to the tracks so that said first and second means elevate and center the front end of the vehicle and said third and fourth means elevate and center the rear end of the vehicle, each of said second and fourth means for centering a vehicle end including a first shoe mounted on the vehicle, said first shoe having front and rear ends and planar inclined surfaces which converge towards one of said ends of the shoe and intersect along an edge inclined with respect to the horizontal, and a pair of rollers having their axes of rotation canted with respect to each other such that both said rollers contact said inclined planar surfaces whereby the vehicle is centered without any play in said transverse direction as said rollers wear.

6. The vehicle precision location assembly according to claim 5 wherein each of said means for elevating a vehicle end includes a second shoe mounted on the vehicle, said second shoe having planar surfaces inclined with respect to the horizontal and spaced apart by a planar horizontal surface therebetween and a roller positioned so as to contact said second shoe surfaces.

7. A vehicle precision location assembly comprising a frame supporting a drive tube between spaced tracks, motor means coupled to said tube for rotating said tube about its longitudinal axis, first means for elevating the front end of the vehicle so that support wheels thereon are spaced from the tracks, second means for elevating the rear end of the vehicle so that support wheels thereon are spaced from the tracks, said first and second means being spaced so that each elevates its associated end of the vehicle, centering means for centering said vehicle in a direction transverse to the direction of travel of the vehicle as the vehicle ends are being elevated, said centering means including a first shoe mounted on the vehicle, said first shoe having front and rear ends and planar inclined surfaces which converge towards one of said ends of the shoe and intersect along an edge inclined with respect to the horizontal, and a pair of rollers having their axes of rotation canted with respect to each other such that said rollers contact both said inclined planar surfaces whereby the vehicle is centered without any play in said transverse direction as said rollers wear.

8. The vehicle precision location assembly according to claim 7 wherein each of said first and second means for elevating a vehicle end includes a second shoe mounted on the vehicle said second shoe having planar surfaces inclined with respect to the horizontal and spaced apart by a planar horizontal surface therebetween and a roller positioned so as to contact said second shoe surfaces.

9. A vehicle precision location assembly comprising a frame supporting a drive tube between spaced tracks, motor means coupled to said tube for rotating said tube about its longitudinal axis, means at each end of the vehicle for elevating the vehicle including a shoe mounted on the vehicle, said shoe having planar surfaces inclined with respect to the horizontal and spaced apart by a planar horizontal surface therebetween and a roller positioned so as to contact said shoe surfaces, and centering means at each end of the vehicle for centering the vehicle in a direction transverse to the direction of travel of the vehicle as the vehicle is being elevated and without any play in said transverse direction regardless of wear of said centering means including another shoe mounted on the vehicle, said last-mentioned shoe having front and rear ends and planar inclined surfaces which converge towards one of said ends of the shoe and intersect along an edge inclined with respect to the horizontal, and a pair of rollers having their axes of rotation canted with respect to each other and spaced from each other along the direction of travel of the vehicle such that each roller contacts one of said inclined planar surfaces along a line substantially parallel to the axis of rotation of the roller.

10. The vehicle precision location assembly according to any one of claims 1, 3, 7 and 9 including means for centering the vehicle in a fore-aft direction of travel of the vehicle while the vehicle is elevated with respect to the tracks.

11. The vehicle precision location assembly according to claim 10 wherein said means for centering the vehicle in said fore-aft direction includes latch means for latching the vehicle in a predetermined fore-aft position.

* * * * *